Patented Apr. 11, 1944

2,346,408

UNITED STATES PATENT OFFICE 2,346,408

PUTTY

Frederick W. Andrews, Akron, Ohio, assignor to The B. F. Goodrich Company, New York, N. Y., a corporation of New York No Drawing. Application December 23, 1939, Serial No. 310,841

3 Claims. (Cl. 260—753)

This invention relates to plastic, spreadable putty compositions to be employed in sealing joints between wood, metal, glass or other surfaces and is particularly concerned with the use of reclaimed rubber in making such compositions.

In the construction of many products and structures it is often necessary that the joints or seams resulting therein be made water-tight or gas-tight. For many of these the ideal sealing material is a putty that can be pressed and kneaded into the open joint. This putty must have certain characteristics to render it suitable for such work. For instance, the putty must not dry out and crack with age; it must not stiffen and become unworkable at low temperatures; it must be easily spreadable and must not dry out and shrink around the joint.

I have discovered that a putty which never completely hardens can be made by using reclaimed rubber in conjunction with other putty materials such as oils and fillers. This permanently plastic composition retains its adhesive properties and does not dry out and become chalky on aging. Because it contains reclaimed rubber, the putty is easily workable and will not spring up behind the putty knife or spreading tool. The improved spreadability of the putty made from reclaimed rubber seems to result from the lack of nerve that is characteristic of ordinary reclaimed rubber.

In a preferred embodiment, the superior putty of the present invention is made by mixing reclaimed rubber, a filler, and a non-volatile oil in an internal mixer and then adding a volatile solvent. This mixture is milled until the product assumes a smooth, homogeneous consistency.

The plasticity or stiffness of the putty may be regulated by the amount or kind of filler that is used, while the resiliency is regulated by the amount of reclaimed rubber used. In general, high proportions of fillers give a stiff and relatively dry product, while lower proportions give a more pasty or fluid product. The most satisfactory putty compositions are those which have a consistency varying from that of a paste to that of a stiff putty. They may be prepared by using from 8% to 15% by weight of reclaimed rubber, based upon the total weight of the materials used, about an equal percentage of volatile solvent, and about half this percentage of a non-volatile oil, the rest of the composition being mineral pigments. An example of such non-hardening putty is:

| | Per cent by weight |
|---|---|
| Reclaimed rubber | 10 |
| Whiting | 75 |
| Linseed oil | 5 |
| Gasoline | 10 |
| | 100 |

In making the superior putty of this invention, any reclaimed rubber may be used that has been prepared by any of the well-known reclaiming methods. The volatile solvent is usually a volatile hydrocarbon solvent such as gasoline or kerosene and the non-volatile oil preferably should be a true drying oil such as linseed oil, tung oil, corn oil, and rape seed oil although the semi-drying oils will also give an excellent putty. The pigment is usually an insoluble mineral pigment such as zinc oxide, white lead, whiting, lithopone, clay, silica, red iron oxide, lamp black, used either singly or in combination, and pigments of different color, particle size, and chemical properties may be selected to give a product possessing desired characteristics. If it is desired, a dye may be used in the putty to give any wanted color. Obviously, however, if a light-colored putty is desired it is necessary to use a light-colored reclaimed rubber.

It is to be understood that the example herein presented is merely illustrative of the invention and that the constituents may be varied and substituted without departing from the spirit and scope of the appended claims.

I claim:

1. A putty comprising approximately 10% by weight of reclaimed rubber; approximately 75% by weight of whiting; approximately 5% by weight of linseed oil; and approximately 10% by weight of gasoline.

2. A putty comprising substantially 8% to 15% by weight of reclaimed rubber based on the total weight of the materials used, about an equal percentage of volatile solvent, about half the above-specified percentage of a non-volatile oil, and filler material comprising the balance of the composition.

3. A putty consisting of the following ingredients in substantially the proportions specified:

| | Per cent by weight |
|---|---|
| Reclaimed rubber | 10 |
| Whiting | 75 |
| Linseed oil | 5 |
| Volatile solvent | 10 |

FREDERICK W. ANDREWS.